US012688457B2

(12) United States Patent
Alda et al.

(10) Patent No.: US 12,688,457 B2
(45) Date of Patent: Jul. 21, 2026

(54) GENERATING USER-BASED TRAINING DATA FOR MACHINE LEARNING

(71) Applicant: SAP SE, Walldorf (DE)

(72) Inventors: Francesco Alda, Wiesloch (DE); Andrea Bruera, Pinerolo (IT); Francesco Di Cerbo, Antibes (FR)

(73) Assignee: SAP SE, Walldorf (DE)

( * ) Notice: Subject to any disclaimer, the term of this patent is extended or adjusted under 35 U.S.C. 154(b) by 1109 days.

(21) Appl. No.: 17/716,368

(22) Filed: Apr. 8, 2022

(65) Prior Publication Data

US 2023/0325776 A1 Oct. 12, 2023

(51) Int. Cl.
| | |
|---|---|
| *G06N 20/00* | (2019.01) |
| *G06N 3/047* | (2023.01) |
| *G06N 3/08* | (2023.01) |
| *G06N 7/01* | (2023.01) |
| G06Q 10/1053 | (2023.01) |

(52) U.S. Cl.
CPC ............. *G06N 20/00* (2019.01); *G06N 3/047* (2023.01); *G06N 3/08* (2013.01); *G06N 7/01* (2023.01); *G06Q 10/1053* (2013.01)

(58) Field of Classification Search
CPC ...... G06Q 10/1053; G06N 3/047; G06N 7/01; G06N 20/00; G06N 3/08; G06F 16/313; G06F 16/3331; G06F 16/9024; G06F 21/6245; G06F 40/295
See application file for complete search history.

(56) References Cited

U.S. PATENT DOCUMENTS

| | | | | |
|---|---|---|---|---|
| 9,477,758 | B1 * | 10/2016 | Tong | .................... G06F 16/951 |
| 11,295,199 | B2 | 4/2022 | Dalli et al. | |
| 2018/0082183 | A1 * | 3/2018 | Hertz | .................... G06Q 10/10 |
| 2019/0236492 | A1 * | 8/2019 | Saha | .................... G06F 40/295 |
| 2021/0266781 | A1 | 8/2021 | Alkurd et al. | |
| 2021/0342380 | A1 * | 11/2021 | Luus | .................... G06N 3/042 |

FOREIGN PATENT DOCUMENTS

| | | |
|---|---|---|
| CN | 110610098 | 12/2019 |
| CN | 111368337 | 7/2020 |
| CN | 111597804 | 8/2020 |
| EP | 3217335 A1 | 9/2017 |

OTHER PUBLICATIONS

Jun Zhang, Graham Cormode, Cecilia M. Procopiuc, Divesh Srivastava, and Xiaokui Xiao. 2017. PrivBayes: Private Data Release via Bayesian Networks. ACM Trans. Database Syst. 42, 4, Article 25 (Dec. 2017), 41 pages. https://doi.org/10.1145/3134428 (Year: 2017).*

(Continued)

*Primary Examiner* — James D. Rutten
(74) *Attorney, Agent, or Firm* — SCHWEGMAN LUNDBERG & WOESSNER, P.A.

(57) ABSTRACT

In an example embodiment, a machine learning-based solution for generating synthetic CVs that preserve the statistical properties of the original corpus is provided, while providing strong privacy guarantees. As synthetic data do not refer to any natural person and can be generated from anonymized data, they are not subject to data protection regulations.

20 Claims, 9 Drawing Sheets

(56)　　　　　　References Cited

OTHER PUBLICATIONS

Haoyue Ping, Julia Stoyanovich, and Bill Howe. 2017. DataSynthesizer: Privacy-Preserving Synthetic Datasets. In Proceedings of the 29th International Conference on Scientific and Statistical Database Management (SSDBM '17). Association for Computing Machinery, New York, NY, USA, Article 42, 1-5. (Year: 2017).*

"European Application Serial No. 22208723.1, Extended European Search Report mailed Aug. 31, 2023", 8 pgs.

Zhang, Jun, "PrivBayes: Private Data Release via Bayesian Networks", ACM Transactions on Database Systems, 42(4), Article 25, (2017), 1-41.

"Chinese Application Serial No. 202211615563.2, Office Action mailed Oct. 30, 2025", w English Translation, 20 pgs.

"European Application Serial No. 22208723.1, Communication Pursuant to Article 943 EPC mailed Mar. 20, 2026", 7 pgs.

* cited by examiner

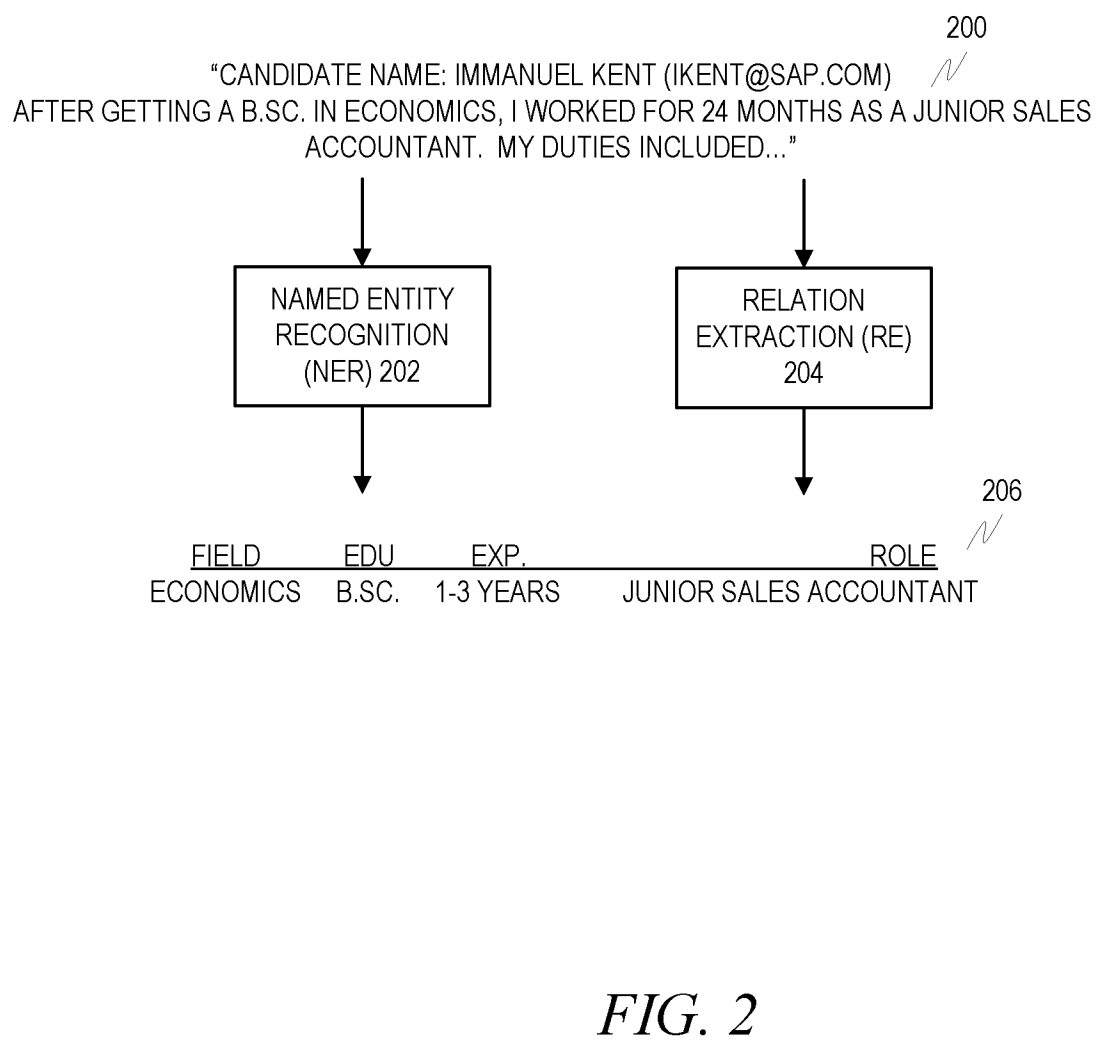

"CANDIDATE NAME: IMMANUEL KENT (IKENT@SAP.COM) AFTER GETTING A B.SC. IN ECONOMICS, I WORKED FOR 24 MONTHS AS A JUNIOR SALES ACCOUNTANT. MY DUTIES INCLUDED..."

200

NAMED ENTITY RECOGNITION (NER) 202

RELATION EXTRACTION (RE) 204

206

| FIELD | EDU | EXP. | ROLE |
|---|---|---|---|
| ECONOMICS | B.SC. | 1-3 YEARS | JUNIOR SALES ACCOUNTANT |

*FIG. 2*

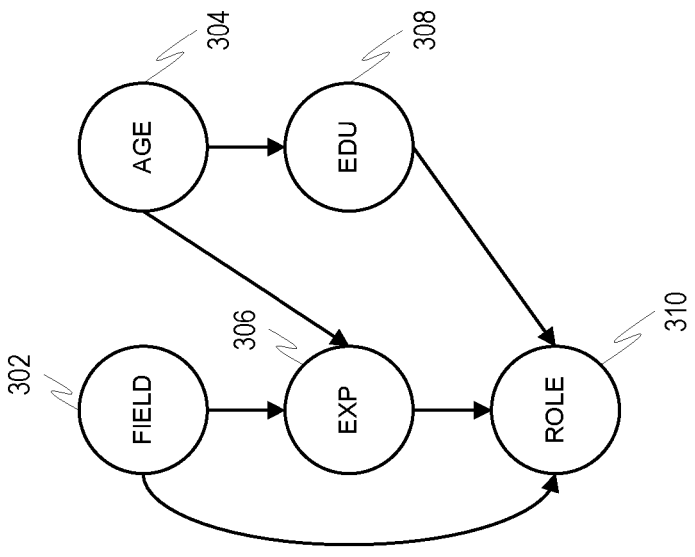
*FIG. 3*

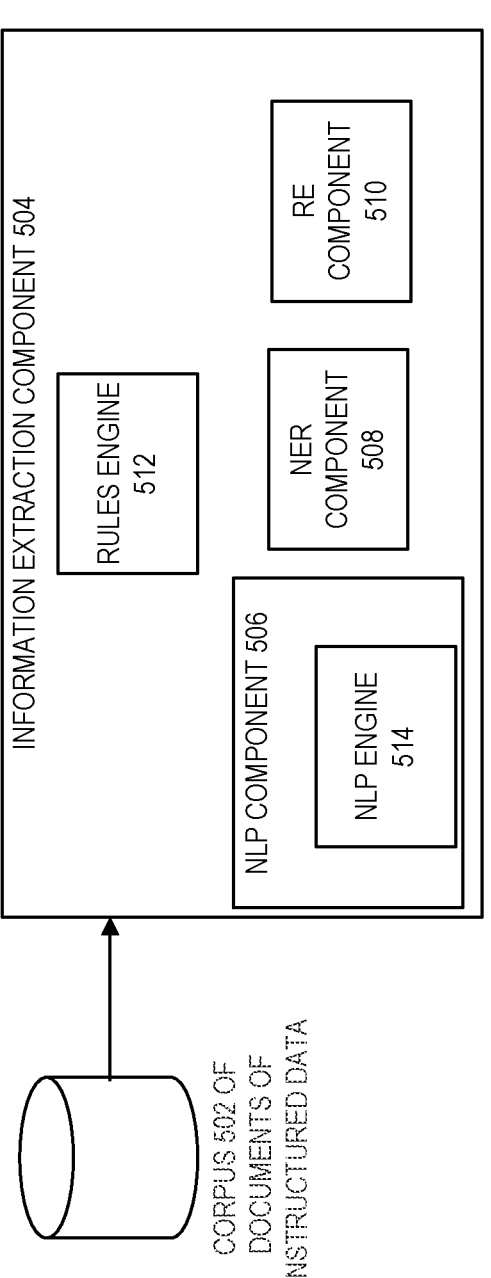
*FIG. 5*

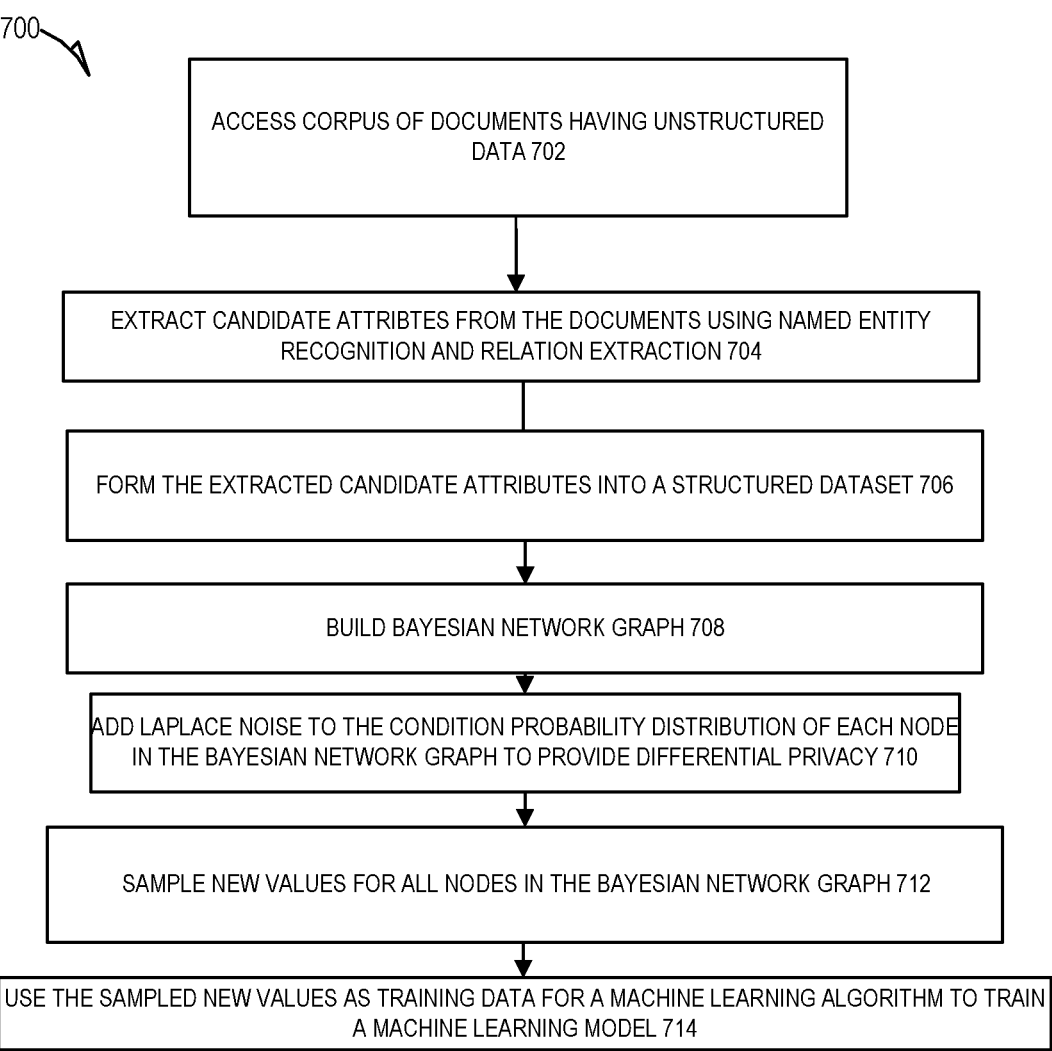

700

ACCESS CORPUS OF DOCUMENTS HAVING UNSTRUCTURED DATA 702

EXTRACT CANDIDATE ATTRIBTES FROM THE DOCUMENTS USING NAMED ENTITY RECOGNITION AND RELATION EXTRACTION 704

FORM THE EXTRACTED CANDIDATE ATTRIBUTES INTO A STRUCTURED DATASET 706

BUILD BAYESIAN NETWORK GRAPH 708

ADD LAPLACE NOISE TO THE CONDITION PROBABILITY DISTRIBUTION OF EACH NODE IN THE BAYESIAN NETWORK GRAPH TO PROVIDE DIFFERENTIAL PRIVACY 710

SAMPLE NEW VALUES FOR ALL NODES IN THE BAYESIAN NETWORK GRAPH 712

USE THE SAMPLED NEW VALUES AS TRAINING DATA FOR A MACHINE LEARNING ALGORITHM TO TRAIN A MACHINE LEARNING MODEL 714

*FIG. 7*

GENERATING USER-BASED TRAINING DATA FOR MACHINE LEARNING

TECHNICAL FIELD

This document generally relates to machine learning. More specifically, this document relates to generating user-based training data for machine learning.

BACKGROUND

Training data may be used to train various types of machine learning models. In some instances, however, it may be difficult to obtain enough training data to train certain types of machine learning models. This can be especially difficult when corpuses from which training data may be obtained include personal or private information that may prevent some or all of the corpuses from being used as the source of the training data to avoid the entanglement of machine learning models with personal data protection requirements.

BRIEF DESCRIPTION OF DRAWINGS

The present disclosure is illustrated by way of example and not limitation in the figures of the accompanying drawings, in which like references indicate similar elements.

FIG. 2 is a diagram illustrating an information extraction procedure, in accordance with an example embodiment.

FIG. 3 is a diagram illustrating an example of a Bayesian network modeling the conditional dependencies between the field of expertise, the age, the experience (in number of years or range), the last education title, and the current (or last) role of a candidate.

FIG. 5 is a block diagram illustrating a system for generating training data for a machine learning algorithm, in accordance with an example embodiment.

FIG. 7 is a flow diagram illustrating a method of generating training data for a machine learning algorithm, in accordance with an example embodiment.

DETAILED DESCRIPTION

Figure 1:
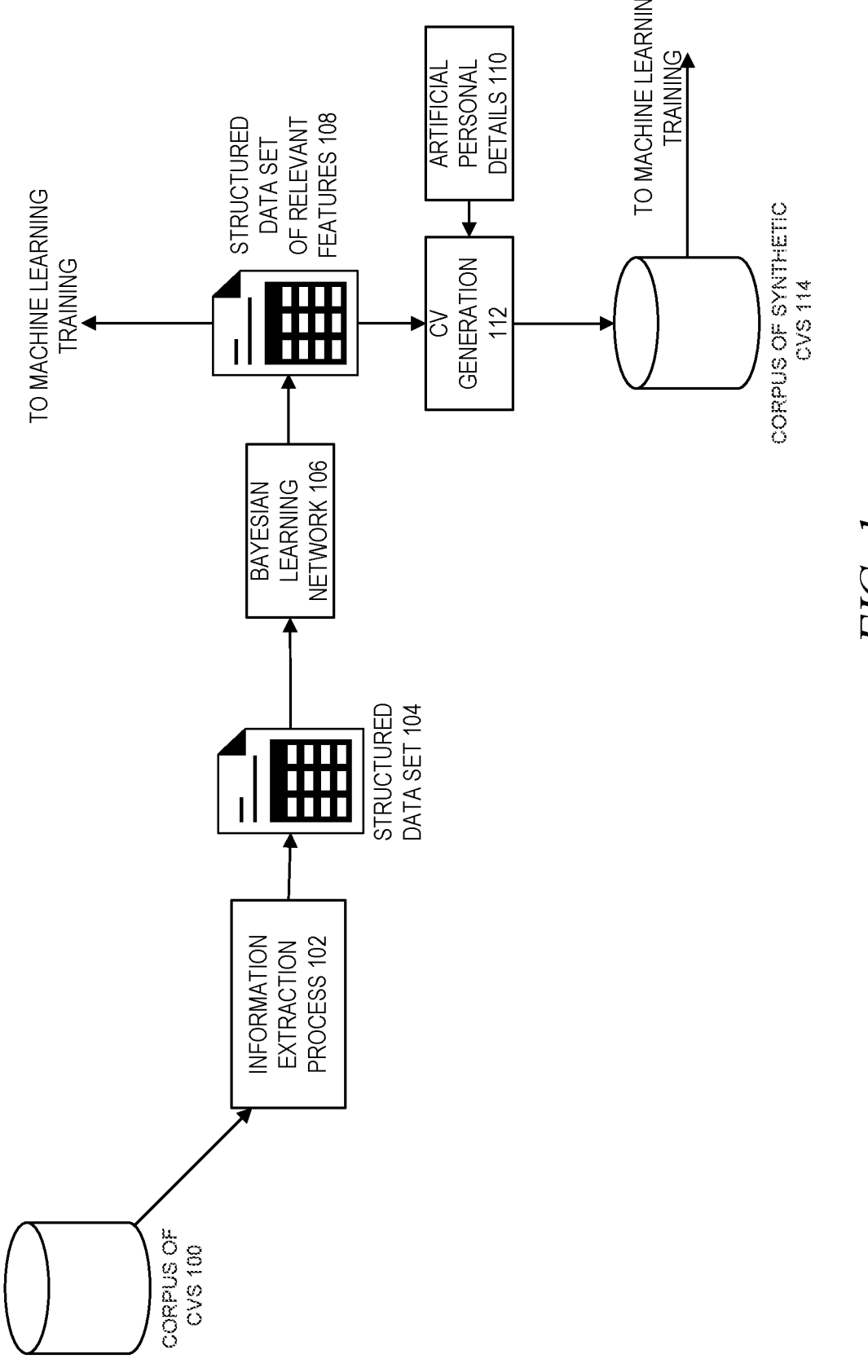
FIG. 1 is a block diagram illustrating building blocks of a solution in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Machine learning has impacted and disrupted many industries due to hardware and algorithmic advancements and the availability of large amounts of data. This has enabled improvements in existing processes or even opened new business opportunities at unprecedented scale. In some industries, though, the extensive adoption of this technology has been delayed or even halted by the fear of breaching local and global data protection regulations like the General Data Protection Regulation (GDPR), the California Consumer Privacy Act (CCPA), or the Personal Information Protection Law (PIPL) to mention a few. As these regulations are meant to protect the privacy of data subjects and prevent abuses, the processing of any information related to a natural person is quite restricted, and non-compliance with these regulations may result in significant financial damages for an organization.

A possible way to enable a less strict usage of such data sources is through anonymization. Data anonymization is the processing of data aimed at irreversibly preventing the identification of a natural person.

Even though several anonymization techniques, e.g., differential privacy or k-anonymity, have been widely accepted for structured data, the same does not hold for unstructured data, where a series of technical challenges arise. First, in a text or document, indirect identifiers may be extremely hard to detect and highly depend on the specific type of document at hand. Second, standard techniques like masking are usually insufficient to mitigate the re-identification risk. Therefore, proper anonymization strategies for unstructured data must rely on careful privacy threat and risk analyses, and the techniques and tools used should be chosen based on the peculiarities of the data at hand.

The present document focuses on a specific type of unstructured data, i.e., Curriculum Vitaes (CVs) or resumes. For Human Resources (HR) organizations, CVs represent a vital source of information, as they are used to select the best candidates for certain positions, understand the skillset of the workforce, plan training and learning activities, etc. Machine learning can dramatically improve and support many of the aforementioned processes that are in most cases still performed manually or semi-automatically. By nature, CVs contain personal data which make them subject to data protection regulations around the world. This implies that organizations and businesses must process these documents in compliance with these regulations unless they are suitably anonymized.

In an example embodiment, a machine learning-based solution for generating synthetic CVs that preserve the statistical properties of the original corpus is provided, while providing strong privacy guarantees. As synthetic data do not refer to any natural person and can be generated from anonymized data, they are not subject to data protection regulations.

It should be noted that while the present document focuses on the generation of CVs or resumes, similar techniques may be applied to other types of unstructured data, and nothing in this document shall be construed as limiting the scope of protections to CV or resume-based environments, unless expressly claimed.

FIG. 1 is a block diagram illustrating building blocks of a solution in accordance with an example embodiment. Here, a corpus of CVs 100 are obtained. These may either be provided in plain text format or some structured data format, such as Portable Document Format (PDF). An information extraction process 102 then may extract candidate attributes from the corpus of CVs 100. As will be described in more detail below, this may be performed using techniques such as optical character recognition (OCR), named entity recognition (NER), and relation extraction (RE), together with regular expressions and/or other heuristics.

In general, a NER service is any service that processes a document to detect an entity within content of the document, identify the location of the entity in the document, and classify the entity as having an entity type. NER services can include publicly available text-mining services on the World Wide Web, such as Alchemy API, Digmap, Extractiv, FISE, Open-Calais and Wikimeta, or proprietary text-mining services employed by companies or other institutions. In an example embodiment, NER is based on an implementation of linear chain Conditional Random Field (CRF) sequence models. CRF is a type of machine learning: instead of a classifier predicting a label for a single sample without considering "neighboring" samples, a CRF can take context into account. To do so, the predictions are modelled as a graphical model, which represents the presence of dependencies between the predictions. In a linear chain CRF, each prediction is dependent only on its immediate neighbors.

For Relation Extraction, there are generally five different methods of performing Relation Extraction:
1. Rule-based RE
2. Weakly Supervised RE
3. Supervised RE
4. Distantly Supervised RE
5. Unsupervised RE Rule-based RE identifies relations through hand-crafted patterns, looking for triples $(X, \alpha, Y)$ where X and Y are entities and $\alpha$ are words in between. For example, in "Paris is in France", $\alpha$="is in". This could be extracted with a regular expression.

Only looking at keyword matches will also retrieve many false positives. This can be mitigated by filtering on named entities, only retrieving (CITY, is in, COUNTRY). The part-of-speech (POS) tags can be considered to remove additional false positives.

These are examples of doing word sequence patterns because the rule specifies a pattern following the order of the text. Alternatively, one can make use of dependency paths in the sentences, knowing which word has a grammatical dependency on what other word. This can greatly increase the coverage of the rule without extra effort.

In Weakly Supervised RE, the idea is to start out with a set of hand-crafted rules and automatically find new ones from the unlabeled text data, through an iterative process (bootstrapping). Alternatively, one can start out with a seed of seed tuples, describing entities with a specific relation. E.g. seed={(ORG:IBM, LOC:Armonk), (ORG:Microsoft, LOC:Redmond)} states entities having the relation "based in".

In Supervised RE, a stacked binary classifier (or a regular binary classifier) is used to determine if there is a specific relation between two entities. These classifiers take features about the text as input, thus requiring the text to be annotated by other NLP modules first. Typical features are: context words, part-of-speech tags, dependency path between entities, NER tags, tokens, proximity distance between words, etc.

Training and extracting can be performed by performing the following operations:
1. Manually labelling the text data according to whether a sentence is relevant or not for a specific relation type
2. Manually labelling the relevant sentences as positive/negative 3. Learning a binary classifier to determine if the sentence is relevant for the relation type
4. Learning a binary classifier on the relevant sentences to determine if the sentence expresses the relation or not
5. Using the classifiers to detect relations in new text data.

In Distantly Supervised RE, the idea of using seed data, as for Weakly Supervised RE, is combined with training a classifier, as for Supervised RE. However, instead of providing a set of seed tuples manually, they can be taken from an existing Knowledge Base (KB), such as Wikipedia, DBpedia, Wikidata, Freebase, Yago.

In Unsupervised RE, relations are extracted from text without having to label any training data, provide a set of seed tuples, or write rules to capture different types of relations in the text. Instead, the system relies on a set of very general constraints and heuristics. This can be accomplished by performing the following operations:
1. Train a self-supervised classifier on a small corpus
2. Pass over the entire corpus and extract possible relations
3. Perform rank-based assessment of relations based on text redundancy The output of the information extraction process 102 is a structured data set 104 with the extracted information. In an example embodiment, this may be a tabular dataset containing the key attributes for a candidate profile. Key attributes may be determined either heuristically or through machine learning. Example key attributes for most CVs would include country of residence, education history, work experience, field of expertise, technical skills, spoken languages, etc. All direct personal identifiers may be either ignored during the information extraction process 102 or removed using other techniques prior to the information extraction process 102.

A Bayesian network 106 may then be built from the structured dataset. A Bayesian network is a probabilistic graphical model that represents a set of variables and their conditional dependencies as a directed acyclic graph (DAG). In the CV setting, the nodes of the graph are the candidate attributes; an edge between two attributes represents a cause-effect relationship between them. For example, the work experience of a candidate is naturally influenced by their education history, and edges between the corresponding attributes would represent this dependency. Each node is associated with a function that takes as input the set of possible values for the node's parent variables, and gives as output the probability distribution on the node's values. This function constitutes a conditional probability distribution. The structure of the graph can be learnt from data or built a priori while the conditional probability distributions are usually learnt from data. Moreover, these conditional probability distributions can also be adjusted or programmatically defined (so-called intervention), which allows users to remove any bias or completely control the generation process. Finally, suitably scaled Laplace noise is added to the conditional probability distributions providing differential privacy.

Once the private Bayesian network 106 is built, new values can be efficiently sampled for all the nodes in the graph, and these new values can be formed into a synthetic, structured dataset of relevant features 108. The sampling procedure follows the conditional dependencies of the attributes, maintaining the consistency and statistical properties of the original dataset. As these attributes do not contain any direct identifier, all personal information (e.g., name, address, email, social media links, etc.) are generated programmatically in a subsequent step, leveraging any library that generates fake data in the programming language of choice, additional heuristics, or predefined rules, resulting in artificial personal details 110. Since all these values are generated artificially and independently of the original dataset, no data privacy is compromised at this operation.

In some example embodiments, the synthetic, structured dataset of relevant features 108 can itself be used as training data to a machine learning algorithm to train a machine learning model. This would be appropriate in cases where the machine learning algorithm is designed to accept such structured datasets. For machine learning algorithms not designed to accept structured datasets (or at least not designed to accept structured datasets of a format matching the synthetic, structured dataset of relevant features 108), additional operations are performed.

Specifically, the synthetic, structured dataset of relevant features together with the artificial personal details 110 are then used to generate the text for each section of the synthetic CV at a CV generation operation 112. This is achieved by carefully combining these values with a variety of scripted textual prompts which are then fed into a pre-trained Natural Language Generation (NLG) model (e.g., GPT-2). Since these models are auto-regressive, the previously generated text is also input to any subsequent section. This enforces the text generation to be as consistent as possible.

Once the text for all the CV sections is generated, it can be assembled in different formats, (e.g., as a JSON file, a text or PDF document) in a corpus of synthetic CVs 114. In particular, PDF files can be built programmatically by injecting the generated text into any chosen template, generating final documents with various styles and layouts.

Referring back to the information extraction process 102, CVs, as a type of text, contain a mixture of natural language sentences and schematic sets of phrases (such as lists, bullet points), aimed at presenting the candidate's personal details, skills, education, employment history. In order to extract precise pieces of information from the raw text (obtained applying Optical Character Recognition (OCR) if the corpus of CVs appear in PDF format) and capturing the candidate's attributes, techniques from Natural Language Processing (NLP) may be used. Most of a candidate's attributes are proper names (which in NLP are referred to as Named Entities, or NE), indicating a large variety of attributes such as their Alma Mater, previous or current employers, place of birth or residence, nationality, spoken languages, obtained certifications, etc.

Therefore, the first step in the pipeline comprises the automatic recognition of NEs, which can be carried out through specialized machine learning models, previously trained to single out individual entities in raw textual data, or through pattern-based approaches. For instance, one could assume that every time the linguistic pattern "was born in . . . " is encountered, a NE has to follow. Each entity extracted in this way represents a possible value for the attributes that are being extracted.

However, not all the attributes of a candidate appear in CVs in the form of proper names: they are often expressed as common nouns, adjectives or verbs, e.g., "expertise," "expert," "I have experience . . . ," etc. In these cases, where strictly speaking there are no NEs, other NLP techniques can be used, such as machine learning models trained for the extraction of such information, or using pattern-based approaches. In this case, the values for the attributes are not NEs, but spans of text.

Other relevant attributes could be related to items bearing Intellectual Property (IP) rights such as patents, research papers, works of art and similar. Although the items themselves cannot be used directly, since they represent direct identifiers (the ownership of the IP is unique and points to one or more natural persons), other properties of these IP items can be extracted (e.g., the number of patents, their fields, etc.) which can be encoded as probability distributions across candidates. A similar case is that of social media accounts, which in their textual form are not usable, e.g., the account name "name_surname," but from which properties such as number of social media accounts, number of followers, or the platforms, could be extracted. Yet another such type of attributes are personal details, such as name, surname, email, phone number, social security number, which again are not used as they represent direct identifiers in their textual form, but from which other candidate attributes may be extracted (e.g., email provider, country code for phone numbers, country of residence, etc.).

Either concurrently or separately, a relation is assigned to each NE, holding between the candidate and the named entity (e.g., Oxford University will be assigned to the relation Alma Mater). This can be done by way of static rules (e.g., every NE which is a university should be labelled as Alma Mater) or by way of machine learning models, trained on automatically recognizing such relations.

FIG. 2 is a diagram illustrating an information extraction procedure, in accordance with an example embodiment. Here, the text 200 from the actual CV is fed through NER 202 and RE 204 processes, to form the tabular extracted attributes 206.

There are a few additional aspects of the information extraction procedure to be described. First, for each attribute, a variable number of values can be extracted—for instance, in the case of candidates who obtained many education titles or were appointed to multiple positions throughout their careers. This type of information can be accommodated in the resulting data structure by admitting multiple values for each attribute (e.g. University 1, University 2, etc.). Second, this process of information extraction may end up discarding some NEs or spans of text which are not recognized to be in any relation with the candidate, or are non-relevant pieces of information.

The result of this process is a set of NEs, extracted from the CV, and annotated with the relation holding between the candidate and the NE. This constitutes a representation of a candidate profile as a structured dataset, instead of a raw text, which can be used, when collected from enough candidates, to model the attributes' probability distributions and conditional dependencies.

Described above was how to build a tabular dataset of candidate attributes from a corpus of CVs. These attributes have conditional dependencies between each other, which are important to model correctly if the goal is to generate meaningful synthetic profiles. For instance, the work experience of candidates is largely influenced by their education history, so it would be beneficial to have a model where one can easily capture this cause-effect relationship.

Bayesian networks are probabilistic graphical models which represent a set of variables and their conditional dependencies as directed acyclic graphs (DAG) G 2:=(V, E). In the present setting, the nodes V of the graph G are the candidate attributes, and an edge $(v1,v2) \in E$ from v1 to v2 indicates that the value of v2 depends on the value of v1. Each root node is associated with a prior probability distribution, while each non-root node has a probability distribution conditioned on the node's parents. For discrete Bayesian networks such as those used in the present solution, these distributions can be implemented as conditional probability tables (CPTs), which display the probability of each possible value of a node given the values taken on by the node's parent variables. The conditional probability distributions may be denoted as $(p_v := \mathbb{P}[v|Pa(v)])_{v \in V}$, where $Pa(v)$ represents the set of parent nodes of $v \in V$.

FIG. 3 is a diagram illustrating an example of a Bayesian network 300 modeling the conditional dependencies between the field of expertise 302, the age 304, the experience (in number of years or range) 306, the last education title 308, and the current (or last) role 310 of a candidate.

In order to generate more realistic profiles, many other attributes may be included (several education titles, job positions, etc.) as discussed earlier. Nonetheless, their conditional dependencies can be identified and drawn in a similar fashion by a domain expert, independently of the training data.

Once the structure of the Bayesian network is defined, the conditional probability distributions can be estimated from data, e.g., via maximum likelihood estimation (MLE). In Table 1, an example of a conditional probability table is provided, which may be learnt from data using the Bayesian network 300 displayed in FIG. 3.

TABLE 1

| Example of a CPT. | | | | | | |
|---|---|---|---|---|---|---|
| | | Exp (in years) | | | | |
| field | age | 1 | 1-3 | 3-5 | . . . | 20+ |
| IT | 20-25 | 0.1 | 0.2 | 0.02 | . . . | 0 |
| IT | 25-30 | 0.05 | 0.3 | 0.2 | . . . | 0 |
| IT | 30-35 | 0.01 | 0.1 | 0.3 | . . . | 0 |
| . | . | . | . | . | . | . |
| . | . | . | . | . | . | . |
| . | . | . | . | . | . | . |
| Economy | 50+ | 0 | 0 | 0 | . . . | 0.6 |

CPTs can also be adjusted or programmatically defined (so-called intervention), which allows users to remove any undesired bias that may be present in the training data or completely control the generation process.

Even though the training dataset described above does not contain any direct identifiers, the CPTs might still leak too much information about an individual to an adversary with enough side knowledge. To prevent this, in an example embodiment, each conditional probability table may be perturbed with Laplace noise, whose scale is suitably calibrated as to provide differential privacy. Perturbing Laplace noise includes adding noise drawn from a Laplace distribution $$\mathcal{M}_{Lap}(x, f, \epsilon) = f(x) + \mathrm{Lap}\left(\mu = 0, b = \frac{\Delta f}{\epsilon}\right),$$

where $\mu$ is the expectation of the Laplace distribution and b is the scale parameter. Roughly speaking, a small-scale noise should suffice for a weak privacy constraint (corresponding to a large value of $\epsilon$), while a greater level of noise would provide a greater degree of uncertainty in what was the original input (corresponding to a small value of $\epsilon$). $\Delta f$ is the sensitivity of the function (i.e., the maximum possible change in the output of d, in l1-norm, over all pairs of input datasets x1 and x2 differing in at most one element.

The scale of the noise corresponds to the ratio between the sensitivity of the CPTs and the privacy parameter, which controls the anonymization level one is aiming to achieve.

The smaller the value of this parameter, the higher the noise injected and hence the privacy guarantees provided. The addition of noise makes sure that the re-identification risk of an individual from the CPTs can be controlled and mitigated as required.

As the noise addition may make the entries of the CPTs negative or not sum to 1, a normalization step may be applied. This post-processing step does not undermine the privacy guarantees, as differential privacy is not affected by an arbitrary data-independent transformation.

Finally, it may be highlighted that if the number of candidate attributes to be modeled is too high, or not enough expertise in identifying the conditional dependencies between the attributes is available, the structure of the Bayesian network, i.e., the edges E of the graph, can also be learnt from data. It is important to notice that this process may leak additional information on the training dataset and thus appropriate anonymization techniques may be used, for example, an end-to-end procedure to learn both the structure and the conditional probability tables for each node of the graph under differential privacy, such as Privbayes.

Once the structure of the Bayesian network is defined and the (perturbed) conditional probability distributions are learnt from the structured dataset built, new values for all the nodes in the graph can be generated via forward-sampling. The following pseudocode may be used for the forward-sampling procedure, where $G=(V, E)$ denotes the underlying graph with vertices V and edges E, and $(p_v := \mathbb{P}[v|Pa(v)])_{v \in V}$ denotes the probability distribution for a node $v \in V$ conditioned on its parent nodes $Pa(v)$ if available.

| Algorithm 1 Sample new values from a Bayesian network. |
|---|
| 1:     procedure FORWARD-SAMPLE(G := (V, E), $(p_v)v \in V$) |
| 2:         $\sigma$ := topological-ordering(G) |
| 3:         for i = 1, . . . , $|\sigma|$ do |
| 4:             v := $\sigma(i)$ |
| 5:             draw $x_i \sim p_v$ |
| 6:         end for |
| 7:         return $(x_1, . . . , x_{|\sigma|})$ |
| 8:     end procedure |

The forward-sampling procedure ensures that the conditional dependencies between the attributes are preserved, producing candidate profiles which are consistent with the original dataset (up to the minor perturbations introduced to provide differential privacy).

As described above, the nodes of the Bayesian network correspond to attributes which do not contain any direct identifier or personal information. All personal data (e.g., name, address, email, social media accounts, etc.) are generated programmatically, leveraging for example any library that generates fake data in the programming language of choice or by defining custom rules or heuristics. This also holds for the generation of the institutions and organizations where the synthetic candidate studied or worked, respectively. In order to maintain a high level of consistency, the generation of this information can be conditioned to the values of certain attributes sampled in Algorithm 1. For instance, the country of residence of a candidate can be used to generate a consistent address and phone number. No data privacy is compromised at this step, as all these values are generated artificially and independently of the original dataset.

Once a synthetic set of attributes is generated for a candidate, it can be turned into a real-looking CV by exploiting Natural Language Generation (NLG) models, which are subsets of Natural Language Processing models whose goal is to generate synthetic text which is as similar as possible to the text that could have been written by a human. This approach can work with any NLG model, ranging from simple, pattern-based approaches to ML-based models.

Pattern-based models can be algorithms that contain a set of linguistic structures, where the candidate attributes can be inserted—possibly adding multiple possible patterns, so as to maximize variability (e.g., I studied for x years at y). Another possibility is using NLG models employing machine learning, which guarantee greater variability in the generated text, because they are trained specifically to mimic a huge variety of human texts. Another advantage of ML models is that they are more suited to large scale automatic creation of synthetic data.

At their core, NLG models based on ML model a sentence generation process as the task of sequentially selecting words from a vocabulary (a list of words), using a probabilistic approach. Intuitively, given a previously generated sequence of words such as "The cat is on the," the model chooses the coming word based on how probable it is to find that word in a natural human language: given a toy vocabulary containing only the words {sea, glass, chair}, the model should choose chair, because, among the words available in the vocabulary, it is the most probable continuation of the sentence "The cat is on the." The role of machine learning in NLG models is to extract from real text the probabilities for the words, conditioned on the presence of other words. One way of doing so is using neural networks (shallow or deep, such as GPT-2, GPT-3, CTRL, BART, and T5), but also other methods based on statistical learning could be used (based on word co-occurrences or n-grams).

In an example embodiment, the attributes generated by the Bayesian network earlier are exploited as a way to control the generation of the NLG model, by using the attributes as starting points for the generation of a CV. The intuition is that the attributes will influence the probabilities of the words chosen by the model so that the resulting text will describe coherently the synthetic candidate, using a mixture of fixed attributes and real-looking text. As an example, given two attributes {University: Oxford} and {Field of Study: Physics}, the NLG may be guided to select words which are more probable when the words Oxford and Physics are found in the previous context. Again, with a toy vocabulary {neutron, beach, beer, experiment}, the probability for neutron and experiment would be higher.

In order to make the model generate realistic text, the attributes may be further embedded in a set of linguistic structures called prompts, which are typical bits of sentences where the attribute would be found in a human language (e.g., I studied x at y). These prompts are presented to the NLG model as starting points for the generation of the CV, influencing the selection of words to appear in the CV through their conditional probabilities, as described above. For each attribute, it is possible to manually create a number of prompts, from which the actual prompt to be used can be randomly sampled for each candidate, in order to create slightly differing, unique CVs for every candidate.

A CV contains different sections, usually with the aim of conveying the candidate's past experience and skills in a sequentially coherent way. The generation of a full CV is started from the creation of an ordered list of prompts, which will correspond to the various sections and will contain the relevant attributes. Then, the generation works in a cyclical fashion: at each step, the model receives as input the preceding text of the CV, followed by the next prompt in the list as input: its task is to generate the following natural language text in the synthetic CV. At the beginning there is no previously generated text, but only the first prompt. In this way, if the NLG model is based on probabilities, at each section the model is directed towards the creation of a new section conditioned on the previous ones, in order to ensure sequential coherence.

Figure 4:
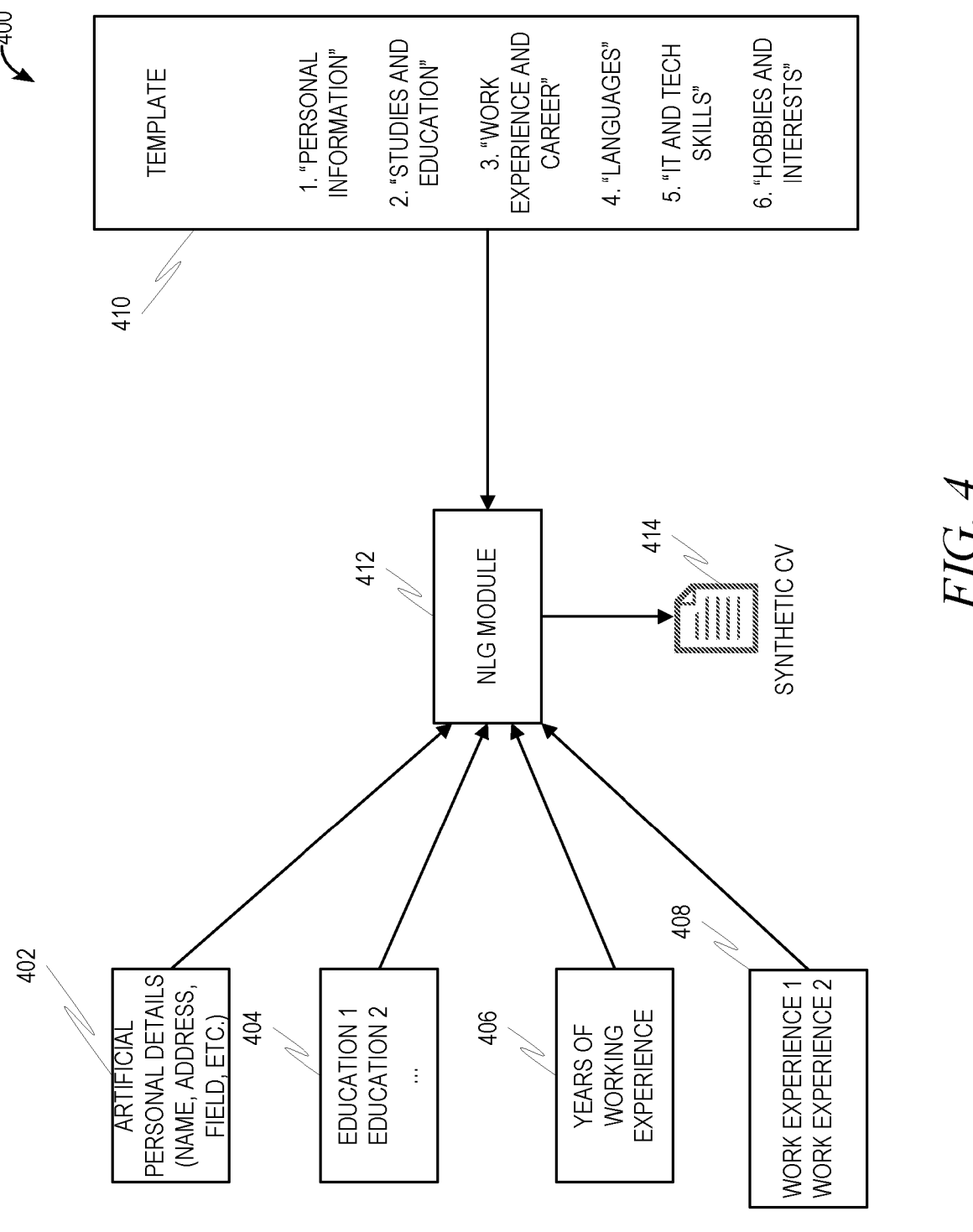
FIG. 4 is a visualization of the generation process, in accordance with an example embodiment.

FIG. 4 is a visualization of the generation process 400, in accordance with an example embodiment. At each generation step, a maximum number of sentences or words to be generated is defined: this value can change depending on the nature of the section (some sections tend to be longer than others in CVs) or on the generation needs (e.g., a CV for a technical job may be shorter, while CVs for managerial positions may involve in-depth descriptions of skills and experiences).

Artificial personal details 402 as well as the extracted attributes, such as education 404, years of working experience 406, and work experience 408 from the corpus of actual CVs are fed along with a template 410 to the NLG module 412, which produces a synthetic CV 414.

The description above explained how NLG models are used to generate the text of the different CV sections. In this section, this text can be assembled in different formats, enabling various usages. The simplest approach consists in building a structured file. For example, this could be any open standard file format which stores data objects in attribute-value pairs, such as Javascript Object Notation (JSON) or YAML. For example, a JSON file can be built where the attributes are the titles of each CV section and the values contain the corresponding generated text. This results in an automatically labeled CV dataset for Artificial Intelligence (AI) projects, which is a convenient and useful outcome if compared to more expensive and time-consuming labeling activities.

Similarly, one can directly construct text files resembling how CVs are usually formatted. The underlying principle would be the same: define the document structure and the titles for each CV section and append the corresponding generated text produced by the language model. This process has been illustrated in FIG. 4.

Finally, if a portable format is more desirable, a PDF file can be built programmatically. In an example embodiment, one or more templates may be utilized, but the solution can easily be extended or applied to other PDF generation software. The templates may utilize markup tags that decorate a plain text to control the generation of a document with a desired graphical layout. The plain text is thus compiled to produce an output file, such as PDF or DVI. As a template is just plain text, it can be loaded as a string in any programming language of choice, and the text for each CV section can be injected into it as string. The enriched string can then be saved to a suitable file system as a .tex file and later compiled, producing a PDF document.

The proposed solution provides the following benefits:
(1) Generation of realistic synthetic CVs which do not relate to any natural person, thus making the usage of this data not subject to data protection regulations. This may improve or even enable a number of use-cases in the HR space, from candidate-job matching and resume parsing, to skills analytics. Since the generation process can be completely controlled, synthetic CVs can also be used to detect bias in existing ML solutions and used to train bias-free models.

(2) The solution preserves the statistical properties and conditional dependencies of the original corpus of CVs, thus enabling a more targeted generation, which mimics the original dataset.

(3) The proposed solution could serve as a data augmentation technique for enriching a small corpus of CVs and lead to more accurate ML models.

(4) The modularity of the solution allows each component to be replaced or modified independently, providing greater flexibility and extendibility.

FIG. 5 is a block diagram illustrating a system 500 for generating training data for a machine learning algorithm, in accordance with an example embodiment. The system 500 includes a corpus 502 of documents of unstructured data. An information extraction component 504 extracts candidate attributes from the corpus, using an NLP component 506, an NER component 508, and/or an RE component 510.

In an example embodiment, NLP component 506 generates embeddings, which are distributed vectorial representations of words (or n-grams) in text. It is then able to generate clusters of words with similar meanings. Examples of NLP techniques that may be used in the NLP component 506 include Fasttext and Bidirectional Encoder Representations from Transformers (BERT). In contrast with Fasttext, BERT uses context-dependent embeddings. This means that the vector of a word would be different based on its context, whereas models such as Fasttext obtain static word embeddings (context independent). The use of context-dependent representations allows the system 500 to obtain a richer understanding of the function of a word in a text, as language can be ambiguous.

The information extraction component 504 may include a rules engine 512 which performs pre-processing/transformation on each piece of text in the corpus 502. This is used to help address jargon in the individual sentences that could adversely affect NLP processing. For example, in some context a period may indicate the end of a sentence, whereas in other contexts it may indicate technical jargon, such as in a uniform resource locator (URL) or computer code. In such instances, the periods in between the parts of the object name are not representative of the end of the sentence, but traditional NLP techniques would consider each period a full stop and terminate the sentence on each. The rules engine 512 applies preprocessing and transformation rules in such a way that technical jargon mentioned in the sentences do not confuse the NLP processing and also helps to ensure that the NLP processing extracts the correct information without losing any contextual data. In other words, the preprocessing changes the technical jargon into content that can be processed by the NLP algorithm. These same preprocessing aspects could also be utilized by the NER component 508 and/or an RE component 510.

Each transformed text portion is then passed to an NLP engine 514. The NLP engine 514 applies one or more NLP rules to the input text portion, filters words into grammatical entities, and produces structured text portion objects. More particularly the NLP engine 514 determines a grammatical type (e.g., noun, verb, etc.) for each word, and the dependencies between each word. Each dependency is indicative of the grammatical relationship between words, such as whether one of the words is a direct object of the other word, punctuation for another word, adverbial clause modifier (advcl) for the other word, etc.

NLP processing may include general filtering actions such as removing unwanted words and characters from the text. This may include removing unnecessary spaces, removing standard punctuations such as !"#$%&'( )*+,−./:;<=>?@[\]

^_'{|}~, keeping only characters containing the letters a-z and the numbers 0-9, normalizing case (such as by converting everything to lowercase), removing stop words such as 'i', 'me', 'my', 'myself', 'we', 'our', 'ours', 'ourselves', 'you', 'your', 'yours', 'yourself', 'yourselves', 'he', 'him', 'his', etc., removing greeting words such as "hi, hello, regards, kind, regards, etc.", and the replacing of some words with regular expressions. Additionally, stemming and lemmatization of words may be performed. Stemming and lemmatization are text normalization techniques. Stemming is the process of reducing inflection in words to their root forms, such as mapping a group of words to the same stem even if the stem itself is not a valid word in the language. Thus, stemming a word involves removing prefixes and suffixes. Lemmatization, on the other hand, reduces the inflected words to a root form that is part of the language. This root word is called a lemma. Lemmatization involves identifying a canonical version of a word, and the canonical version may involve more or less than merely removing suffixes and prefixes. For example, ran, run, and running may be lemmatized to the canonical word "run", even though changing ran to run does not involve adding or removing suffixes.

The NLP engine 514 finds out all the grammatical dependency objects in the text portion, the relationships among objects, the conditions involved in the text portion, and then, based on all this information, prepares the context of the text portion.

The NLP engine 514 learns how to parse a text portion and assign an embedding to the text portion based on the parsing. The embedding identifies a set of coordinates (called a vector) in a multidimensional space to each parsed sentence. One or more similarity measures between coordinates may then be used to identify the similarity between corresponding sentences. One example metric is cosine similarity. In cosine similarity, the cosine of the angle between two vectors is computed. The cosine similarity of two sentences will range from 0 to 1. If the cosine similarity is 1, it means the two vectors have the same orientation and thus are identical. Values closer to 0 indicate less similarity. Other measures of similarity may be used, in lieu of or in addition to the cosine similarity, such as Euclidean distance and Jaccard similarity. Additionally, these baseline metrics can be improved by methods such as ignoring "stop" words and computing averages weighted by term frequency— inverse document frequency (TF-IDF). Alternatively, techniques such as Word Mover's Distance (WMD) and Smooth Inverse Frequency (SIF) can also be employed.

Figure 6:
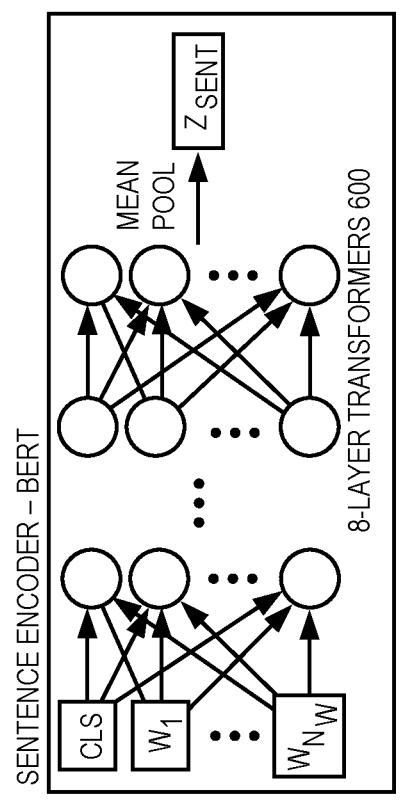
FIG. 6 is a block diagram illustrating Bidirectional Encoder (BERT) in accordance with an example embodiment.

In an example embodiment, Bidirectional Encoder Representations from Transformers (BERT) are used to encode text portions into embeddings. It should be noted that BERT is merely used in some example embodiments, and in others another language model can be used in lieu of BERT. FIG. 6 is a block diagram illustrating BERT in accordance with an example embodiment. BERT uses transformer layer(s) 600 to encode the input sentence to an embedding. Each transformer layer is defined as follows:

$$TFLayer\left(h^{n-1}\right) = FC\left(MultiAttn\left(h^{n-1}\right)\right);$$

$$FC(x) = relu(xW_1 + b_1)W_2 + b_2;$$

$$MultiAttn\left(h^{n-1}\right) = concat\left(head_1\left(h^{n-1}\right), \ldots, head_k\left(h^{n-1}\right)\right)W^O,$$

13

-continued $$\text{head}_i(h^{n-1}) = \text{softmax}\left(\frac{(h^{n-1}W_q^i)(h^{n-1}W_k^i)}{\sqrt{d_k}}\right)(h^{n-1}W_v^i).$$

where $h^{n-1}$ is the output of the previous transformer layer. Here, a BERT model with 8 transformer layers is used, and the output sentence embedding $z_{sent}$ is defined as the mean-pooling result of the last transformer layer's output. For simplicity, batch normalization and residual connections are omitted in the equations.

FIG. 7 is a flow diagram illustrating a method 700 of generating training data for a machine learning algorithm, in accordance with an example embodiment. At operation 702, a corpus of documents having unstructured data is accessed. This may include, for example, a corpus of actual CVs. At operation 704, candidate attributes may be extracted from the documents using named entity recognition and relation extraction. At operation 706, the extracted candidate attributes are formed into a structured dataset.

At operation 708, a Bayesian network graph is built. The Bayesian network graph is a directed acyclic graph having the extracted candidate attributes as nodes with edges between nodes representing relationships between candidate attributes, wherein each node is further associated with a function comprising a conditional probability distribution. At operation 710, Laplace noise is added to the conditional probability distribution of each node in the Bayesian network graph to provide differential privacy. At operation 712, new values for all nodes are sampled in the Bayesian network graph. At operation 714, the sampled new values are used as training data for a machine learning algorithm to train a machine learning model.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
accessing a corpus of documents having unstructured data;
extracting candidate attributes from the corpus using named entity recognition and relation extraction;
forming the extracted candidate attributes into a structured dataset;
building a Bayesian network graph, the Bayesian network graph being a directed acyclic graph having the extracted candidate attributes as nodes with edges between nodes representing relationships between candidate attributes, wherein each node includes a value and is associated with a function comprising a conditional probability distribution;
adding Laplace noise to the conditional probability distribution of a plurality of nodes in the Bayesian network graph to provide differential privacy;
sampling new values for a plurality of nodes in the Bayesian network graph; and
using the sampled new values as training data for a machine learning algorithm to train a machine learning model.

Example 2. The system of Example 1, wherein the operations further comprise generating artificial personal details for the sampled new values; and
wherein the using the sampled new values includes using the sampled new values along with the generated personal details as training data for the machine learning algorithm to train the machine learning model.

Example 3. The system of Examples 1 or 2, wherein the operations further comprise:
removing bias from the sampled new values by adjusting the conditional probability distributions.

Example 4. The system of any of Examples 1-3, wherein each function takes as input a set of possible values for a corresponding node's parent variables and gives as output a probability distribution on the corresponding node's values.

Example 5. The system of any of Examples 1-4, wherein the sampling includes following conditional dependencies of each node in the Bayesian network graph, maintaining consistency and properties of an original corpus of documents.

Example 6. The system of Example 2, wherein the operations further comprise:
combining the sampled new values with the generated personal details using an auto-regressive pre-trained natural language generation (NLG) model.

Example 7. The system of any of Examples 1-6, wherein the extracting further comprises using a natural language processing (NLP) machine learning model.

Example 8. A method comprising:
accessing a corpus of documents having unstructured data;
extracting candidate attributes from the corpus using named entity recognition and relation extraction;
forming the extracted candidate attributes into a structured dataset;
building a Bayesian network graph, the Bayesian network graph being a directed acyclic graph having the extracted candidate attributes as nodes with edges between nodes representing relationships between candidate attributes, wherein each node includes a value and is associated with a function comprising a conditional probability distribution;
adding Laplace noise to the conditional probability distribution of a plurality of nodes in the Bayesian network graph to provide differential privacy;
sampling new values for a plurality of nodes in the Bayesian network graph; and
using the sampled new values as training data for a machine learning algorithm to train a machine learning model.

Example 9. The method of Example 8, further comprising generating artificial personal details for the sampled new values; and
wherein the using the sampled new values includes using the sampled new values along with the generated personal details as training data for the machine learning algorithm to train the machine learning model.

Example 10. The method of Example 8 or 9, further comprising:
removing bias from the sampled new values by adjusting the conditional probability distributions.

Example 11. The method of any of Examples 8-10, wherein each function takes as input a set of possible values for the corresponding node's parent variables and gives as output a probability distribution on a corresponding node's values.

Example 12. The method of any of Examples 8-10, wherein the sampling includes following conditional dependencies of each node in the Bayesian network graph, maintaining consistency and properties of an original corpus of documents.

Example 13. The method of Example 9, further comprising:

combining the sampled new values with the generated personal details using an auto-regressive pre-trained natural language generation (NLG) model.

Example 14. The method of any of Examples 8-13, wherein the extracting further comprises using a natural language processing (NLP) machine learning model.

Example 15. A non-transitory machine-readable medium storing instructions which, when executed by one or more processors, cause the one or more processors to perform operations comprising:

accessing a corpus of documents having unstructured data;

extracting candidate attributes from the corpus using named entity recognition and relation extraction;

forming the extracted candidate attributes into a structured dataset;

building a Bayesian network graph, the Bayesian network graph being a directed acyclic graph having the extracted candidate attributes as nodes with edges between nodes representing relationships between candidate attributes, wherein each node includes a value and is associated with a function comprising a conditional probability distribution;

adding Laplace noise to the conditional probability distribution of a plurality of nodes in the Bayesian network graph to provide differential privacy;

sampling new values for a plurality of nodes in the Bayesian network graph; and using the sampled new values as training data for a machine learning algorithm to train a machine learning model.

Example 16. The non-transitory machine-readable medium of Example 15, further comprising generating artificial personal details for the sampled new values; and wherein the using the sampled new values includes using the sampled new values along with the generated personal details as training data for the machine learning algorithm to train the machine learning model.

Example 17. The non-transitory machine-readable medium of Examples 15 or 16, further comprising:

removing bias from the sampled new values by adjusting the conditional probability distributions.

Example 18. The non-transitory machine-readable medium of any of Examples 15-17, wherein each function takes as input a set of possible values for the corresponding node's parent variables and gives as output a probability distribution on a corresponding node's values.

Example 19. The non-transitory machine-readable medium of any of Examples 15-18, wherein the sampling includes following conditional dependencies of each node in the Bayesian network graph, maintaining consistency and properties of an original corpus of documents.

Example 20. The non-transitory machine-readable medium of Example 16, further comprising:

combining the sampled new values with the generated personal details using an auto-regressive pre-trained natural language generation (NLG) model.

Figure 8:
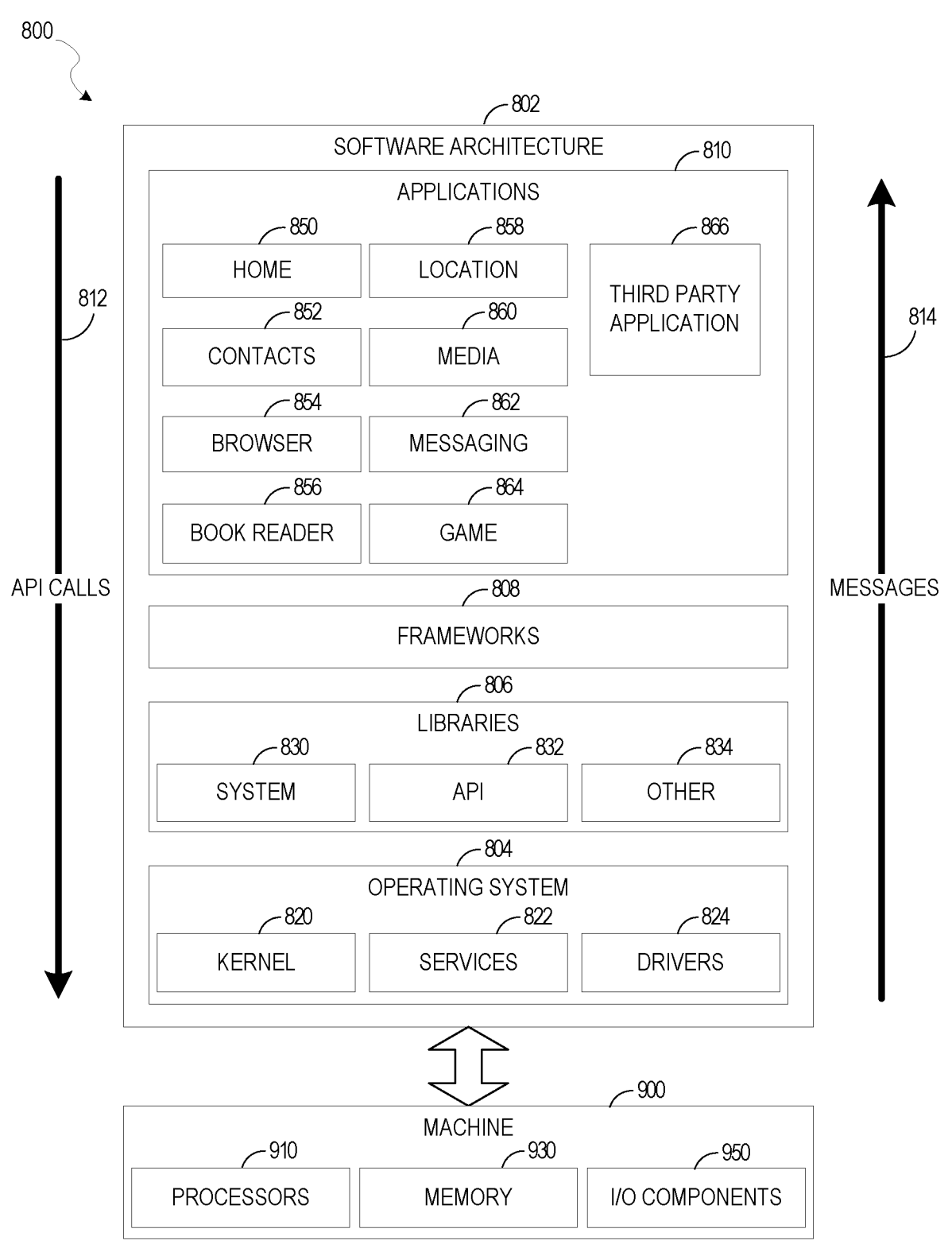
FIG. 8 is a block diagram illustrating an architecture of software, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke Application Program Interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810. For example, the frameworks 808 provide various graphical user interface functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. The applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 866 can invoke the API calls 812 provided by the operating system 804 to facilitate functionality described herein.

Figure 9:
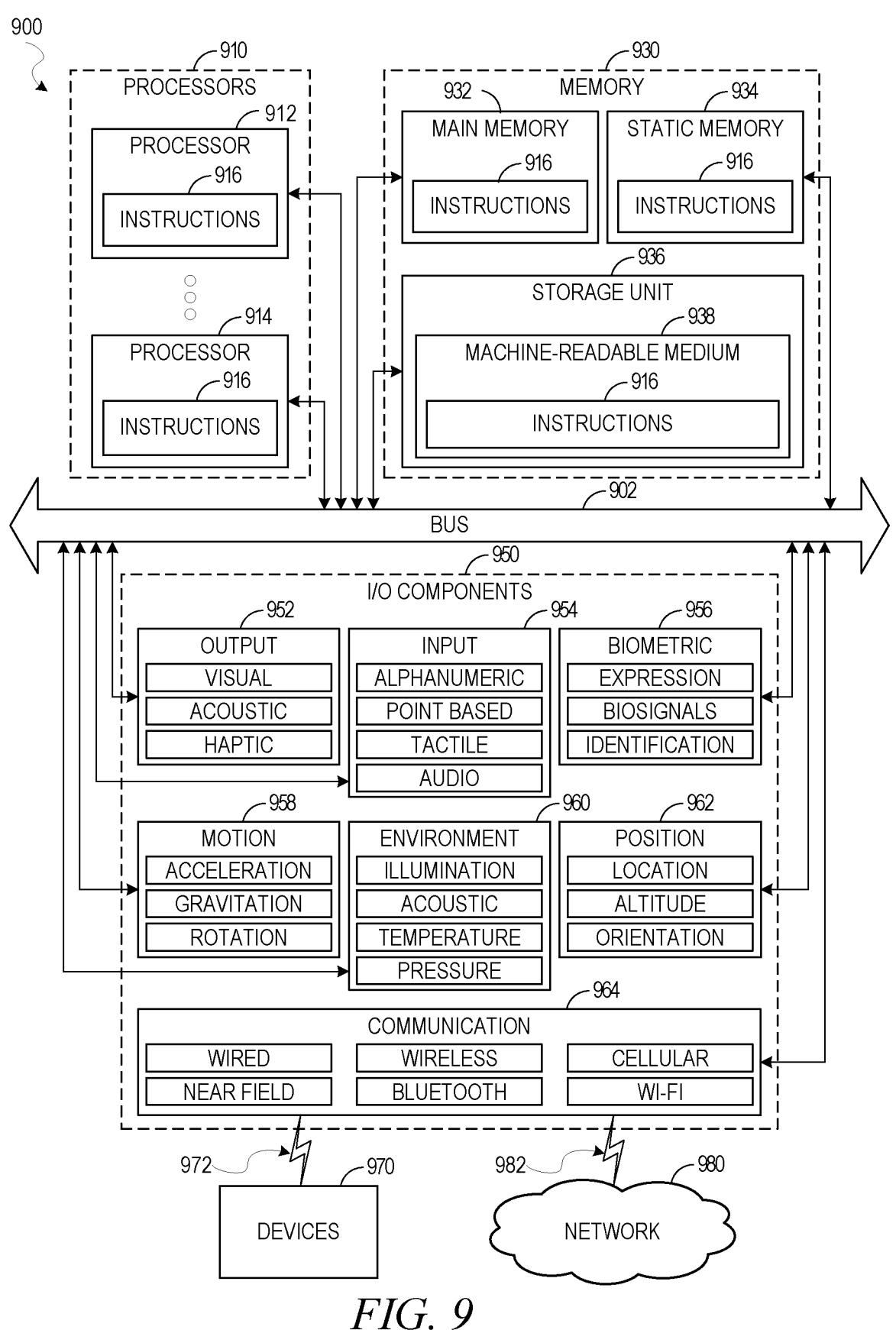
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) cause the machine 900 to perform any one or more of the methodologies discussed herein to be executed. For example, the instructions 916 may cause the machine 900 to execute the method of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 8G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 880 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
accessing a corpus of documents having unstructured data;
extracting candidate attributes from the corpus using named entity recognition and relation extraction;
forming the extracted candidate attributes into a structured dataset;
building a Bayesian network graph, the Bayesian network graph being a directed acyclic graph having the extracted candidate attributes as nodes with edges between nodes representing relationships between candidate attributes, wherein each node includes a value and is associated with a function comprising a conditional probability distribution;
adding Laplace noise to the conditional probability distribution of a plurality of nodes in the Bayesian network graph to provide differential privacy;
sampling new values for a plurality of nodes in the Bayesian network graph; and
using the sampled new values as training data for a machine learning algorithm to train a machine learning model.

2. The system of claim 1, wherein the operations further comprise generating artificial personal details for the sampled new values; and
wherein the using the sampled new values includes using the sampled new values along with the generated personal details as training data for the machine learning algorithm to train the machine learning model.

3. The system of claim 1, wherein the operations further comprise:
removing bias from the sampled new values by adjusting the conditional probability distributions.

4. The system of claim 1, wherein each function takes as input a set of possible values for a corresponding node's parent variables and gives as output a probability distribution on the corresponding node's values.

5. The system of claim 1, wherein the sampling includes following conditional dependencies of each node in the Bayesian network graph, maintaining consistency and properties of an original corpus of documents.

6. The system of claim 2, wherein the operations further comprise:
combining the sampled new values with the generated personal details using an auto-regressive pre-trained natural language generation (NLG) model.

7. The system of claim 1, wherein the extracting further comprises using a natural language processing (NLP) machine learning model.

8. A method comprising:
accessing a corpus of documents having unstructured data;
extracting candidate attributes from the corpus using named entity recognition and relation extraction;
forming the extracted candidate attributes into a structured dataset;
building a Bayesian network graph, the Bayesian network graph being a directed acyclic graph having the extracted candidate attributes as nodes with edges between nodes representing relationships between candidate attributes, wherein each node includes a value and is associated with a function comprising a conditional probability distribution;
adding Laplace noise to the conditional probability distribution of a plurality of nodes in the Bayesian network graph to provide differential privacy;
sampling new values for a plurality of nodes in the Bayesian network graph; and
using the sampled new values as training data for a machine learning algorithm to train a machine learning model.

9. The method of claim 8, further comprising generating artificial personal details for the sampled new values; and
wherein the using the sampled new values includes using the sampled new values along with the generated personal details as training data for the machine learning algorithm to train the machine learning model.

10. The method of claim 8, further comprising:
removing bias from the sampled new values by adjusting the conditional probability distributions.

11. The method of claim 8, wherein each function takes as input a set of possible values for a corresponding node's parent variables and gives as output a probability distribution on the corresponding node's values.

12. The method of claim 8, wherein the sampling includes following conditional dependencies of each node in the Bayesian network graph, maintaining consistency and properties of an original corpus of documents.

13. The method of claim 9, further comprising:
combining the sampled new values with the generated personal details using an auto-regressive pre-trained natural language generation (NLG) model.

14. The method of claim 8, wherein the extracting further comprises using a natural language processing (NLP) machine learning model.

15. A non-transitory machine-readable medium storing instructions which, when executed by one or more processors, cause the one or more processors to perform operations comprising:
accessing a corpus of documents having unstructured data;
extracting candidate attributes from the corpus using named entity recognition and relation extraction;
forming the extracted candidate attributes into a structured dataset;
building a Bayesian network graph, the Bayesian network graph being a directed acyclic graph having the extracted candidate attributes as nodes with edges between nodes representing relationships between candidate attributes, wherein each node includes a value and is associated with a function comprising a conditional probability distribution;

adding Laplace noise to the conditional probability distribution of a plurality of nodes in the Bayesian network graph to provide differential privacy;

sampling new values for a plurality of nodes in the Bayesian network graph; and using the sampled new values as training data for a machine learning algorithm to train a machine learning model.

16. The non-transitory machine-readable medium of claim 15, further comprising generating artificial personal details for the sampled new values; and wherein the using the sampled new values includes using the sampled new values along with the generated personal details as training data for the machine learning algorithm to train the machine learning model.

17. The non-transitory machine-readable medium of claim 15, further comprising:

removing bias from the sampled new values by adjusting the conditional probability distributions.

18. The non-transitory machine-readable medium of claim 15, wherein each function takes as input a set of possible values for a corresponding node's parent variables and gives as output a probability distribution on the corresponding node's values.

19. The non-transitory machine-readable medium of claim 15, wherein the sampling includes following conditional dependencies of each node in the Bayesian network graph, maintaining consistency and properties of an original corpus of documents.

20. The non-transitory machine-readable medium of claim 16, further comprising:

combining the sampled new values with the generated personal details using an auto-regressive pre-trained natural language generation (NLG) model.

* * * * *